(12) United States Patent
Tiagi et al.

(10) Patent No.: US 11,659,026 B2
(45) Date of Patent: May 23, 2023

(54) SERVICE LABELING USING SEMI-SUPERVISED LEARNING

(71) Applicant: VMware, Inc., Palo Alto, CA (US)

(72) Inventors: Alok Tiagi, Sunnyvale, CA (US); Farzad Ghannadian, Burlingame, CA (US); Karen Hayrapetyan, Fremont, CA (US); Laxmikant Vithal Gunda, San Jose, CA (US); Sunitha Krishna, Saratoga, CA (US); Ashot Aslanyan, Palo Alto, CA (US); Anirban Sengupta, Saratoga, CA (US)

(73) Assignee: VMWARE, INC., Palo Alto, CA (US)

( * ) Notice: Subject to any disclaimer, the term of this patent is extended or adjusted under 35 U.S.C. 154(b) by 199 days.

(21) Appl. No.: 16/855,305

(22) Filed: Apr. 22, 2020

(65) Prior Publication Data

US 2021/0336899 A1    Oct. 28, 2021

(51) Int. Cl.
| | |
|---|---|
| *H04L 47/78* | (2022.01) |
| *H04L 47/125* | (2022.01) |
| *G06K 9/62* | (2022.01) |
| *H04L 9/40* | (2022.01) |
| *H04L 41/22* | (2022.01) |
| *H04L 67/01* | (2022.01) |

(52) U.S. Cl.
CPC .......... *H04L 47/781* (2013.01); *G06K 9/6257* (2013.01); *H04L 41/22* (2013.01); *H04L 47/125* (2013.01); *H04L 63/20* (2013.01); *H04L 67/01* (2022.05)

(58) Field of Classification Search
CPC ....... H04L 63/14; H04L 63/20; H04L 47/125; H04L 47/781; H04L 67/42; H04L 67/1012; H04L 41/12; G06K 9/6257
See application file for complete search history.

(56) References Cited

U.S. PATENT DOCUMENTS

| | | | |
|---|---|---|---|
| 9,294,492 B1 * | 3/2016 | Martini | ................ H04L 63/145 |
| 10,462,030 B2 | 10/2019 | Movsisyan | |
| 11,223,653 B2 * | 1/2022 | Anderson | ........... H04L 63/0428 |

(Continued)

OTHER PUBLICATIONS

Yang Jian. English translation of CN 209491843 A. (Year: 2019).*

(Continued)

*Primary Examiner* — John M Macilwinen
(74) *Attorney, Agent, or Firm* — Patterson + Sheridan, LLP (57) ABSTRACT

The disclosure provides an approach for workload labeling and identification of known or custom applications. Embodiments include determining a plurality of sets of features comprising a respective set of features for each respective workload of a first subset of a plurality of workloads. Embodiments include identifying a group of workloads based on similarities among the plurality of sets of features. Embodiments include receiving label data from a user comprising a label for the group of workloads. Embodiments include associating the label with each workload of the group of workloads to produce a training data set. Embodiments include using the training data set to train a model to output labels for input workloads. Embodiments include determining a label for a given workload of the plurality of workloads by inputting features of the given workload to the model.

17 Claims, 7 Drawing Sheets

(56) References Cited

U.S. PATENT DOCUMENTS

| | | | |
|---|---|---|---|
| 2009/0313625 A1* | 12/2009 | Sharoff | G06F 11/3414 |
| | | | 718/100 |
| 2016/0359740 A1* | 12/2016 | Parandehgheibi | G06F 16/235 |
| 2018/0102943 A1 | 4/2018 | Movsisyan | |
| 2018/0121250 A1 | 5/2018 | Qi et al. | |
| 2018/0176102 A1 | 6/2018 | Bansal | |
| 2018/0176261 A1 | 6/2018 | Bansal | |
| 2019/0180141 A1 | 6/2019 | Tiagi et al. | |
| 2019/0182276 A1 | 6/2019 | Tiagi et al. | |
| 2019/0245754 A1* | 8/2019 | Greene, Jr. | G06N 20/00 |
| 2019/0268305 A1* | 8/2019 | Xu | H04L 61/1511 |
| 2020/0026566 A1* | 1/2020 | Baggerman | G06F 40/186 |
| 2020/0120109 A1* | 4/2020 | Shu | H04L 63/20 |
| 2021/0084074 A1* | 3/2021 | Kirner | H04L 63/0236 |
| 2021/0103828 A1* | 4/2021 | Bitterfeld | H04L 41/0853 |
| 2021/0144159 A1* | 5/2021 | Sanghvi | H04L 63/1425 |
| 2021/0152526 A1* | 5/2021 | Kohout | H04L 41/12 |

OTHER PUBLICATIONS

Watts. English translation of ES-2700535-A1. (Year: 2019).*
U.S. Appl. No. 16/808,393, entitiled "Intent-Bassed Network Virualization Design".

* cited by examiner

SERVICE LABELING USING SEMI-SUPERVISED LEARNING

BACKGROUND

Software defined networking (SDN) comprises a plurality of hosts in communication over a physical network infrastructure, each host having one or more virtualized endpoints such as virtual machines (VMs), containers, or other virtual computing instances (VCIs) that are connected to logical overlay networks that may span multiple hosts and are decoupled from the underlying physical network infrastructure. Though certain aspects are discussed herein with respect to VMs, it should be noted that they may similarly be applicable to other suitable VCIs.

For example, any arbitrary set of VMs in a datacenter may be placed in communication across a logical Layer 2 network by connecting them to a logical switch. Each logical switch corresponds to a virtual network identifier (VNI), meaning each logical Layer 2 network can be identified by a VNI. The logical switch is collectively implemented by at least one virtual switch on each host that has a VM connected to the logical switch. The virtual switch on each host operates as a managed edge switch implemented in software by the hypervisor on each host. Forwarding tables at the virtual switches instruct the host to encapsulate packets, using a virtual tunnel endpoint (VTEP) for communication from a participating VM to another VM on the logical network but on a different (destination) host. The original packet from the VM is encapsulated at the VTEP with an outer IP header addressed to the destination host using a mapping of VM IP addresses to host IP addresses. At the destination host, a second VTEP decapsulates the packet and then directs the packet to the destination VM. Logical routers extend the logical network across subnets or other network boundaries using IP routing in the logical domain. The logical router is collectively implemented by at least one virtual router on each host or a subset of hosts. Each virtual router operates as a router implemented in software by the hypervisor on the hosts.

SDN generally involves the use of a management plane (MP) and a control plane (CP). The management plane is concerned with receiving network configuration input from an administrator or orchestration automation and generating desired state data that specifies how the logical network should be implemented in the physical infrastructure. The management plane may have access to a database application for storing the network configuration input. The control plane is concerned with determining the logical overlay network topology and maintaining information about network entities such as logical switches, logical routers, endpoints, etc. The logical topology information specifying the desired state of the network is translated by the control plane into network configuration data that is then communicated to network elements of each host. The network configuration data, for example, includes forwarding table entries to populate forwarding tables at virtual switch(es) provided by the hypervisor (i.e., virtualization software) deployed on each host. An example control plane logical network controller is described in U.S. Pat. No. 9,525,647 entitled "Network Control Apparatus and Method for Creating and Modifying Logical Switching Elements," which is fully incorporated herein by reference.

The rapid growth of network virtualization has led to an increase in large scale SDN data centers. The scale of such data centers may be very large, often including hundreds of servers with each server hosting hundreds of VCIs. With such scale comes a need to be able to operate such topologies efficiently and securely. Techniques exist for applying security policies and providing other management functions for VCIs based on labels associated with the VCIs. A given VCI may be labeled by an administrator and the label may be used for grouping, security policy enforcement (e.g., based on security groups), statistical analysis of VCIs, and/or the like. For example, a given security policy may apply to all VCIs labeled with a first label. However, an administrator manually applying labels to all VCIs can be a tedious and time-consuming process, particularly as numbers of VCIs in data centers continue to grow. Furthermore, manual labeling of large numbers of VCIs introduces risk of errors. As such, there is a need in the art for improved techniques for labeling VCIs.

SUMMARY

Embodiments provide a method of workload labeling. Embodiments include: determining a plurality of sets of features comprising a respective set of features for each respective workload of a first subset of a plurality of workloads; identifying a group of workloads based on similarities among the plurality of sets of features; receiving label data from a user comprising a label for the group of workloads; associating the label with each workload of the group of workloads to produce a training data set; using the training data set to train a model to output labels for input workloads; and determining a label for a given workload of the plurality of workloads by inputting features of the given workload to the model.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for workload labeling and identification of known and custom applications. In the art, a workload generally refers to a computing task with a discrete set of application logic that can be executed independently of any parent or related application logic. A workload may refer to a VCI in certain embodiments. In some embodiments, a workload may refer to an application, a container, or another discrete set of computing logic. While some existing techniques involve an administrator manually applying labels to workloads, these techniques can be inefficient and difficult, particularly as numbers of workloads increase. Machine learning techniques can improve efficiency of workload labeling significantly, but generating training data for use in training a machine learning model for workload labeling can also become inefficient and difficult.

Machine learning models may be trained to associate certain input "features" with output "labels." Training data for a machine learning model may include labeled sets of features. For example, a training data instance may include a set of one or more features of a workload associated with a label applied to the workload by an administrator. Generally, the larger the training data set, the better the results of the trained model will be. As such, generating large amounts of training data may involve manually labeling large numbers of workloads.

As such, embodiments of the present disclosure involve semi-supervised learning techniques that significantly reduce the amount of manual input required while allowing large training data sets to be generated, resulting in improved results from trained models. In certain embodiments, a subset of all workloads in a networking environment is identified for use in generating training data. The subset may, for example, be a given percentage of all workloads.

One or more features of each workload in the subset are identified. Features of a workload may include, for example, one or more of network ports on which the workload listens/receives traffic when coupled to a network, network ports on which the workload connects to remote processes (e.g., outside of the data center) via the network, processes running on the workload, remote processes to which the workload connects, numbers of connections to a process or port, and the like. The workloads in the subset are then grouped into one or more groups based on feature similarity. In one example, cosine similarity between features of workloads is used to group similar workloads in the subset into a group.

The one or more groups of workloads are then presented to a user, such as an administrator, so that the user can provide one or more labels for each group. In certain embodiments, the user provides one or more labels for a single workload in each group. The user may also, in some embodiments, review the groups and identify workloads that do not belong in certain groups. Once a group (e.g., all groups) has a workload that has been assigned a label or labels, the label or labels for that workload may be applied to all workloads in the group. As such, the user does not need to manually label every workload in the subset, and may only provide a single label or set of labels for each group. Multiple labels may be applied to a workload, such as if the workload runs multiple applications.

The labeled groups of workloads are then used as training data for a model. For example, each given workload in the subset may be used as a training data instance comprising the one or more features of the given workload associated with the one or more labels assigned by the user to the group to which the workload belongs.

The training data is then used to train the model. Training the model may involve iteratively adjusting parameters of the model based on the training data such that, for a given training data instance, providing the features of the given training data instance as inputs to the model results in an output from the model that matches a label or labels of the training data instance.

The trained model is then used to determine labels for the rest of the workloads that were not included in the subset, new workloads, etc. Features of each given workload are determined and then provided as inputs to the model, and the model outputs one or more labels for the given workload. For example, the model may determine scores for each of a plurality of potential labels, the scores indicating a confidence of whether a given label should be applied to a given workload. If a score for a given label exceeds a threshold, for example, then the given label may be applied to the given workload. As such, techniques described herein allow a potentially large number of workloads to be accurately labeled with minimal user input.

Once workloads are labeled, the labels may be used for a variety of purposes, such as defining security groups, applying security policies, statistical analysis, network segmentation, network monitoring, intrusion detection/prevention, user interface (UI) visualization, and/or the like. For example, the labels may allow workloads to be conveniently grouped in a UI and targeted for a variety of purposes, such as monitoring and the like. Grouping of workloads based on labels determined according to techniques described herein may allow a UI to be de-cluttered and simplified. For example, filters may be applied to workloads based on labels. If a user is not interested in core services, workloads labeled with core services can be filtered (e.g., and excluded from display within a UI).

Figure 1:
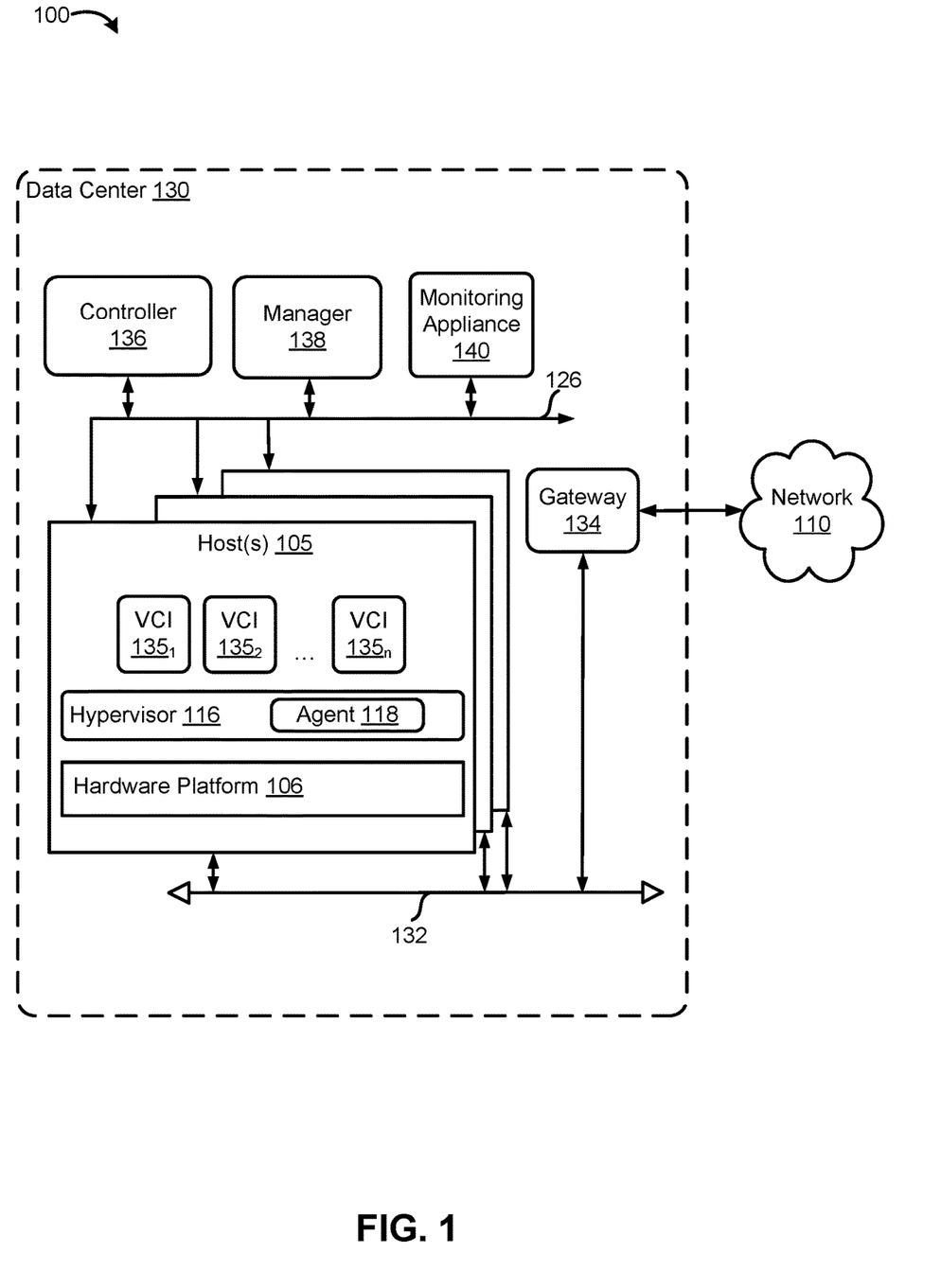
FIG. 1 depicts example physical and virtual network components with which embodiments of the present disclosure may be implemented.

FIG. 1 depicts example physical and virtual network components with which embodiments of the present disclosure may be implemented.

Networking environment 100 includes data center 130 connected to network 110. Network 110 is generally representative of a network of computing entities such as a local area network ("LAN") or a wide area network ("WAN"), a network of networks, such as the Internet, or any connection over which data may be transmitted.

Data center 130 generally represents a set of networked computing entities, and may comprise a logical overlay network. Data center 130 includes host(s) 105, a gateway 134, a data network 132, which may be a Layer 3 network, and a management network 126. Data network 132 and management network 126 may be separate physical networks or different virtual local area networks (VLANs) on the same physical network.

Each of hosts 105 may be constructed on a server grade hardware platform 106, such as an x86 architecture platform. For example, hosts 105 may be geographically co-located servers on the same rack or on different racks. Host 105 is configured to provide a virtualization layer, also referred to as a hypervisor 116, that abstracts processor, memory, storage, and networking resources of hardware platform 106 into multiple virtual computing instances (VCIs) $135_1$ to $135_n$ (collectively referred to as VCIs 135 and individually referred to as VCI 135) that run concurrently on the same host. VCIs 135 may include, for instance, VMs, containers, virtual appliances, and/or the like.

Hypervisor 116 may run in conjunction with an operating system (not shown) in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In certain aspects, hypervisor 116 implements one or more logical entities, such as logical switches, routers, etc. as one or more virtual entities such as virtual switches, routers, etc. In some implementations, hypervisor 116 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine. Although aspects of the disclosure are described with reference to VMs, the teachings herein also apply to other types of virtual computing instances (VCIs) or data compute nodes (DCNs), such as containers, which may be referred to as Docker containers, isolated user space instances, namespace containers, etc. In certain embodiments, VCIs 135 may be replaced with containers that run on host 105 without the use of a hypervisor.

Gateway 134 provides VCIs 135 and other components in data center 130 with connectivity to network 110, and is used to communicate with destinations external to data center 130 (not shown). Gateway 134 may be a virtual computing instance, a physical device, or a software module running within host 105.

Controller 136 generally represents a control plane that manages configuration of VCIs 135 within data center 130. Controller 136 may be a computer program that resides and executes in a central server in data center 130 or, alternatively, controller 136 may run as a virtual appliance (e.g., a VM) in one of hosts 105. Although shown as a single unit, it should be understood that controller 136 may be implemented as a distributed or clustered system. That is, controller 136 may include multiple servers or virtual computing instances that implement controller functions. Controller 136 is associated with one or more virtual and/or physical CPUs (not shown). Processor(s) resources allotted or assigned to controller 136 may be unique to controller 136, or may be shared with other components of data center 130. Controller 136 communicates with hosts 105 via management network 126.

Manager 138 represents a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints. In one embodiment, manager 138 is a computer program that executes in a central server in networking environment 100, or alternatively, manager 138 may run in a VM, e.g. in one of hosts 105. Manager 138 is configured to receive inputs from an administrator or other entity, e.g., via a web interface or API, and carry out administrative tasks for data center 130, including centralized network management and providing an aggregated system view for a user.

Monitoring appliance 140 generally represents a component of data center 130 that monitors attributes of workloads, such as VCIs, on hosts 105 and performs labeling of workloads according to embodiments of the present disclosure. In one embodiment, monitoring appliance 140 is a computer program that executes in a central server in networking environment 100, or alternatively, monitoring appliance 140 may run in one or more VMs, e.g. in one or more of hosts 105. In one embodiment, monitoring appliance 140 is implemented in a distributed fashion across a plurality of VCIs on a plurality of hosts 105.

In some embodiments, monitoring appliance 140 communicates with an agent on each of hosts 105, such as agent 118 in hypervisor 116, in order to retrieve attributes of VCIs, such as VCIs 135. In some embodiments, attributes are retrieved by hypervisor 116 from endpoint monitoring components (not shown) running on every VCI and/or from network flow data, such as through a virtual switch, monitored by hypervisor 116 on each host 105. Attributes may include, for example, network ports (e.g., coupled to a virtual switch) on which a VCI listens for traffic, network ports on which a VCI connects to remote processes, processes running on a VCI, remote processes to which a VCI connects, numbers of connections to a process or port from a VCI, numbers of processes running on a VCI, command line parameters of a VCI, and/or the like. One or more of the attributes of VCIs are then used as one or more of the features of the VCIs in order to group VCIs based on similarity of features.

For example, monitoring appliance 140 may use cosine similarity between features of VCIs in order to group similar VCIs of a subset of all VCIs in data center 130, as described in more detail below with respect to FIGS. 2 and 3. The groups may be used for efficient labelling of training data by a user, as described in more detail below with respect to FIG. 4. Labeled training data is then used to train a model to output one or more labels when features of a given VCI are input into the model, as described in more detail below with respect to FIG. 5. For instance, the model may be used to label one or more (e.g., all) VCIs in data center 130 other than the subset of VCIs that was used for training data.

Applying labels to VCIs allows them to be more effectively managed. For example, manager 138 or a separate security component, may apply security policies to VCIs based on labels indicative of the known and/or custom services that are running on the VCIs. In one example, a given security policy applies to all VCIs running a particular service, and labels of such VCIs indicate services running on the VCIs. A known service generally refers to a commonly used service (e.g., Microsoft® Active Directory®), while a custom service generally refers to a service that is identified by a user.

In some embodiments, labeled workloads and their features are shared between multiple data centers in order to improve training data for a model that is used across the multiple data centers. This may accomplished, for example, using a service such as Amazon Web Services® Telemetry.

Figure 2:
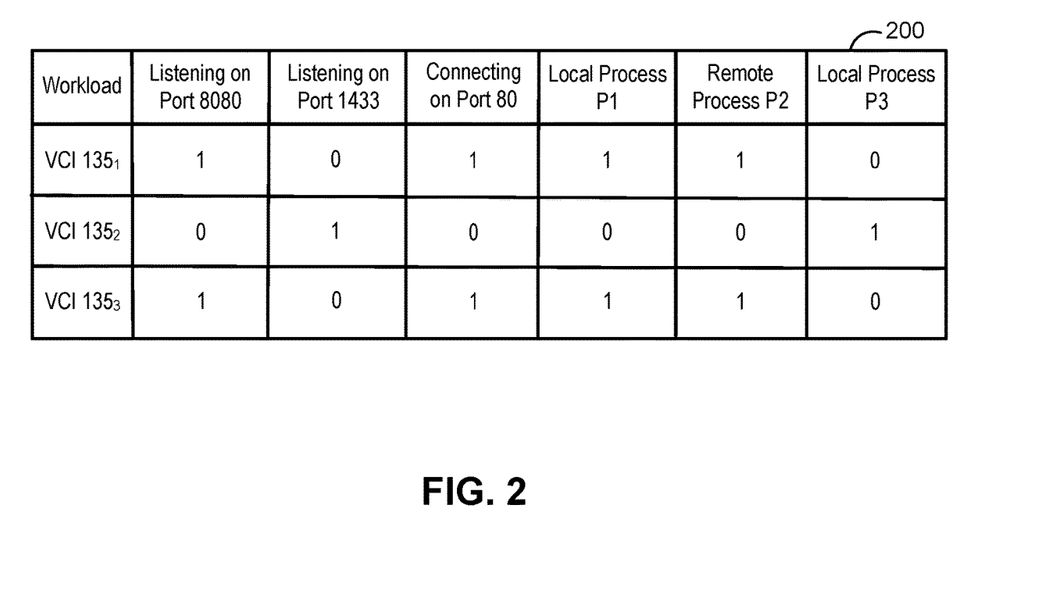
FIG. 2 depicts an example of features related to workload labeling according to embodiments of the present disclosure.

FIG. 2 depicts an example 200 of features related to workload labeling according to embodiments of the present disclosure. Example 200 includes features of VCIs $135_1$, $135_2$, and $135_3$ of FIG. 1. For instance, the features may have been collected by monitoring appliance 140 of FIG. 1 through interaction with agent 118 of hypervisor 116 of FIG. 1. As shown each row corresponds to a VCI 135, and each column corresponds to a feature. A value of one in a given cell indicates that the corresponding VCI 135 includes the corresponding feature. A value of zero in a given cell indicates that the corresponding VCI 135 does not include the corresponding feature.

The features include whether each VCI is listening on port 8080 (yes for VCI $135_1$ and VCI $135_3$ and no for VCI $135_2$), whether each VCI is listening on port 1433 (no for VCI $135_1$ and VCI $135_3$ and yes for VCI $135_2$), whether each VCI is connecting on port 80 (yes for VCI $135_1$ and VCI $135_3$ and no for VCI $135_2$), whether each VCI runs local process P1 (yes for VCI $135_1$ and VCI $135_3$ and no for VCI $135_2$), whether each VCI connects to a remote process P2 (yes for VCI $135_1$ and VCI $135_3$ and no for VCI $135_2$), and whether each VCI runs a local process P3 (no for VCI $135_1$ and VCI $135_3$ and yes for VCI $135_2$).

It is noted that while the features listed in example 200 are binary features, other features may not be binary. For example, another feature may be a number of connections to a port or a process. Furthermore, example 200 only lists features of three VCIs for illustration purposes, but features of a larger number of VCIs may be determined.

Figure 3:
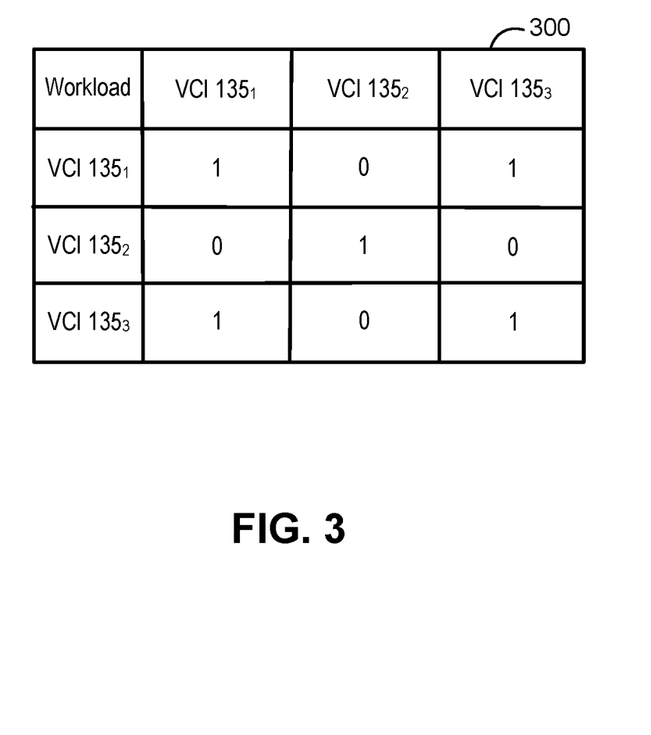
FIG. 3 depicts an example of grouping VCIs based on features according to embodiments of the present disclosure.

FIG. 3 depicts an example 300 of grouping VCIs based on features according to embodiments of the present disclosure. In some embodiments, example 300 is an adjacency matrix. Example 300 involves grouping VCIs based on features depicted in example 200 of FIG. 2.

Example 300 illustrates a match score for each pair of VCIs. The match scores may, for example, be calculated using cosine similarity between features of each pair of VCIs in a subset of all VCIs in the data center. The match score may be a normalized value between 0 and 1, where a higher match score indicates a closer match. In some embodiments, weights are applied to features when determining similarity between VCIs (e.g., as part of a cosine similarity calculation). For example, features related to commonly used ports and registered ports may be weighted higher than ephemeral ports. In some examples, features related to a given port are weighted based on numbers of connections to the given port (e.g., both as a source and destination). In certain embodiments, weights may be incorporated into feature determination for each workload (e.g., based on the workload's activity and role in the network topology), and each feature may be weighted prior to the cosine similarity calculation. Features may, for example, be normalized based on a scale of enterprise networks and/or based on activities of given workloads (e.g., numbers of connections, etc.). For example, activities of workloads may be monitored for a time to determine numbers of connections and the like, and the monitored information may be used to normalize features prior to calculating cosine similarities.

The match score between VCI $135_1$ and VCI $135_2$ is 0, the match score between VCI $135_1$ and VCI $135_3$ is 1, and the match score between VCI $135_2$ and VCI $135_3$ is 0. Because the match score between VCI $135_1$ and VCI $135_3$ is 1, VCI $135_1$ and VCI $135_3$ are grouped together. In other embodiments, some VCIs may have a match score that falls somewhere between 0 and 1, and a match may be determined if the match score exceeds a threshold.

Figure 4:
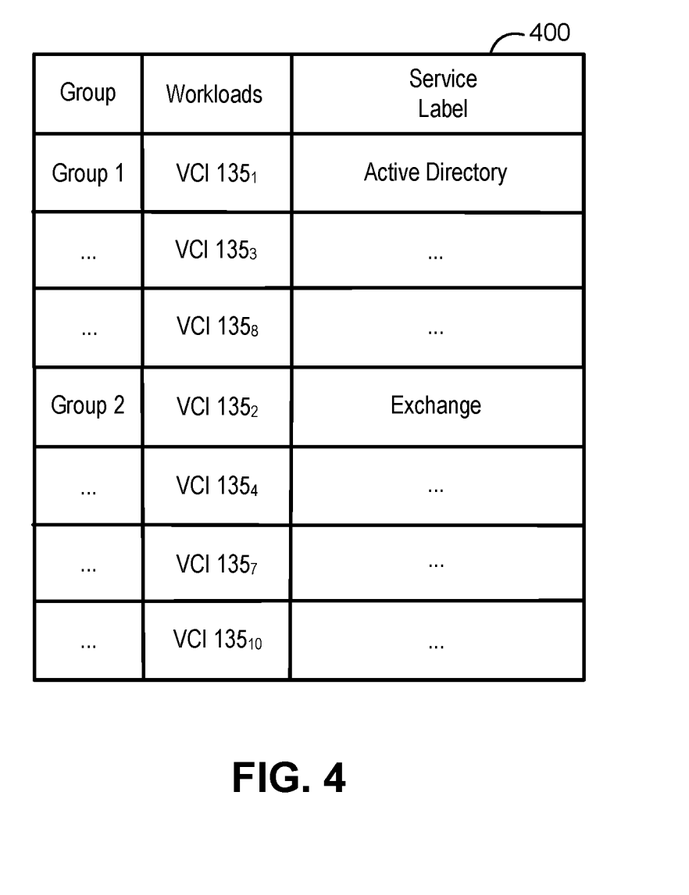
FIG. 4 depicts an example of receiving labels for grouped VCIs according to embodiments of the present disclosure.

FIG. 4 depicts an example 400 of receiving labels for grouped VCIs according to embodiments of the present disclosure. In example 400, VCIs $135_1$, $135_3$, and $135_8$ have been grouped together as Group 1 and VCIs $135_2$, $135_4$, $135_7$, and $135_{10}$ have been grouped together as Group 2. Group 1 and Group 2 may have been determined using cosine similarity between features of VCIs, as described above with respect to FIGS. 2 and 3.

A label is received for each group indicating a service running on the VCIs in the group. Group 1 is labeled "Active Directory," indicating that the VCIs in Group 1 run Microsoft® Active Directory® Services, and Group 2 is labeled "Exchange," indicating that the VCIs in Group 2 run Microsoft® Exchange services.

In some embodiments, a user provides the labels via a user interface. For instance, the grouped VCIs may be displayed for review and/or labeling. At least a subset of the features of each VCI may be displayed for review. In some embodiments, features considered most important to a workload's inclusion in a group are displayed, such as the features that were most similar to other workloads in the group. In some embodiments, features considered to be less significant, such as features related to ephemeral ports, are not displayed. Ephemeral ports (e.g., short-lived transport protocol ports for internet protocol communications that are automatically allocated from a predefined range) may be considered less significant because they can be randomly chosen by an application and change dynamically. Furthermore, derived features may not be displayed, as they may not be directly interpretable without reference to underlying attributes of a workload. A derived feature is a feature determined based on another feature, such as a dimensionality reduction of a matrix (e.g., principal component analysis, singular value decomposition, matrix factorization, and the like), learned embeddings (e.g., deepwalk, node2vec, and the like), log normalization, graph centrality, and the like.

In some embodiments, displaying the features considered most important to a workload's inclusion in a group increases the explainability of techniques described herein. Informing users of the reasons for groupings allows automated grouping processes to be understood and verified.

The user interface allows a user to efficiently label other VCIs in a group by applying a single label (e.g., "Active Directory"). In some embodiments, the user may determine that one or more VCIs do not belong in a given group, and may provide feedback indicating that the VCI should be removed from the group or may assign a label to the individual VCI that is different than the label applied to the group. If a VCI is removed from a group, it may be added to another group (e.g., the group with which the VCI has a next highest cosine similarity), or may remain ungrouped. Ungrouped VCIs, such as VCIs that are not similar to any other VCIs or VCIs that have been removed from a group, may also be displayed for labeling, or may be removed from the subset used for training data. In certain embodiments, any VCIs not included in the training data may be labeled using the trained model, as described in more detail below with respect to FIG. 5.

The label or labels received from the user for a given group are applied to other VCIs in the given group. Then the labeled VCIs from the groups are used as training data for a model, as described in more detail below with respect to FIG. 5.

Figure 5:
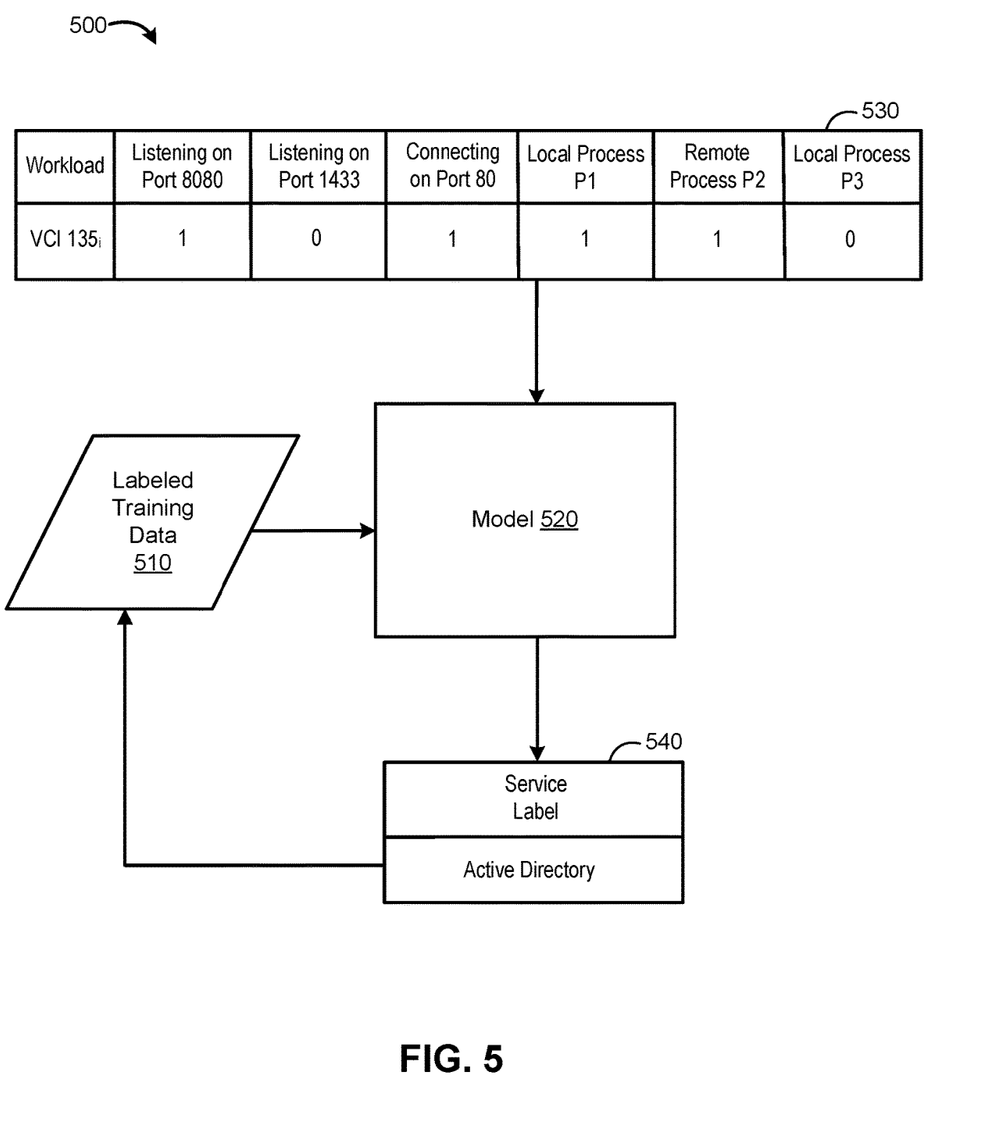
FIG. 5 depicts an example of training a model for workload labeling according to embodiments of the present disclosure.

FIG. 5 depicts an example 500 of training a model for workload labeling according to embodiments of the present disclosure.

In example 500, model 520 is trained using labeled training data 510. Labeled training data 510 generally represents a plurality of training data instances, each training data instance including features of a given workload associated with a label. For example, labeled training data 510 may include VCIs that were labeled in groups as described above with respect to FIG. 4.

Model 520 may, for example, be a tree-based machine learning model, such as a random forest or gradient boosting machine (e.g., XGBoost or LightGBM) model, or a linear regression model, such as an elastic net, ridge, or lasso regression model. In some embodiments, model 520 is a neural network. In certain embodiments, model 520 may be any type of classification model. Techniques for training model 520 generally involve iteratively adjusting model parameters until outputs from model 520 in response to input features from labeled training data 510 match the labels for the input features in labeled training data 510.

Once trained, model 520 is able to output a label for a set of input features. For example, feature set 530 is provided as input to model 520. Feature set 530 represents features of a VCI $135_i$ of FIG. 1. Feature set 530 indicates that VCI $135_i$ is listening on port 8080, not listening on port 1433, connecting on port 80, runs local process P1, connects to remote process P2, and does not run local process P3.

In response to feature set 530, model 520 outputs label 540, which includes a service label of "Active Directory." It is noted that model 520 may also output additional labels. For example, model 520 may determine confidence scores for each of a plurality of labels, and the confidence scores may be used to determine whether each given label should be applied to feature set 530 (e.g., based on whether the confidence score for a given label exceeds a threshold). Label 540 is applied to VCI $135_i$, and may be used for various purposes, such as applying security policies to VCI $135_i$. In some embodiments model 520 is used to determine labels for all VCIs running in data center 130 of FIG. 1 other than the subset of VCIs that were grouped and used for labeled training data 510.

Labels output by model 520 may, in some instances, be used to retrain model 520. For example, if label 540 is approved by a user (e.g., if an administrator confirms that label 540 is accurate), then label 540 may be used to generate an additional training data instance for labeled training data 510 that is used to retrain model 520. The additional training data instance may, for example, include feature set 530 associated with label 540. User feedback may alternatively indicate that label 540 is incorrect. In some cases, a user may provide an alternative label for feature set 530, and the alternative label may be used for a training data instance of labeled training data 510 for retraining the model. As such, model 520 may be dynamically retrained over time for improved accuracy.

Figure 6:
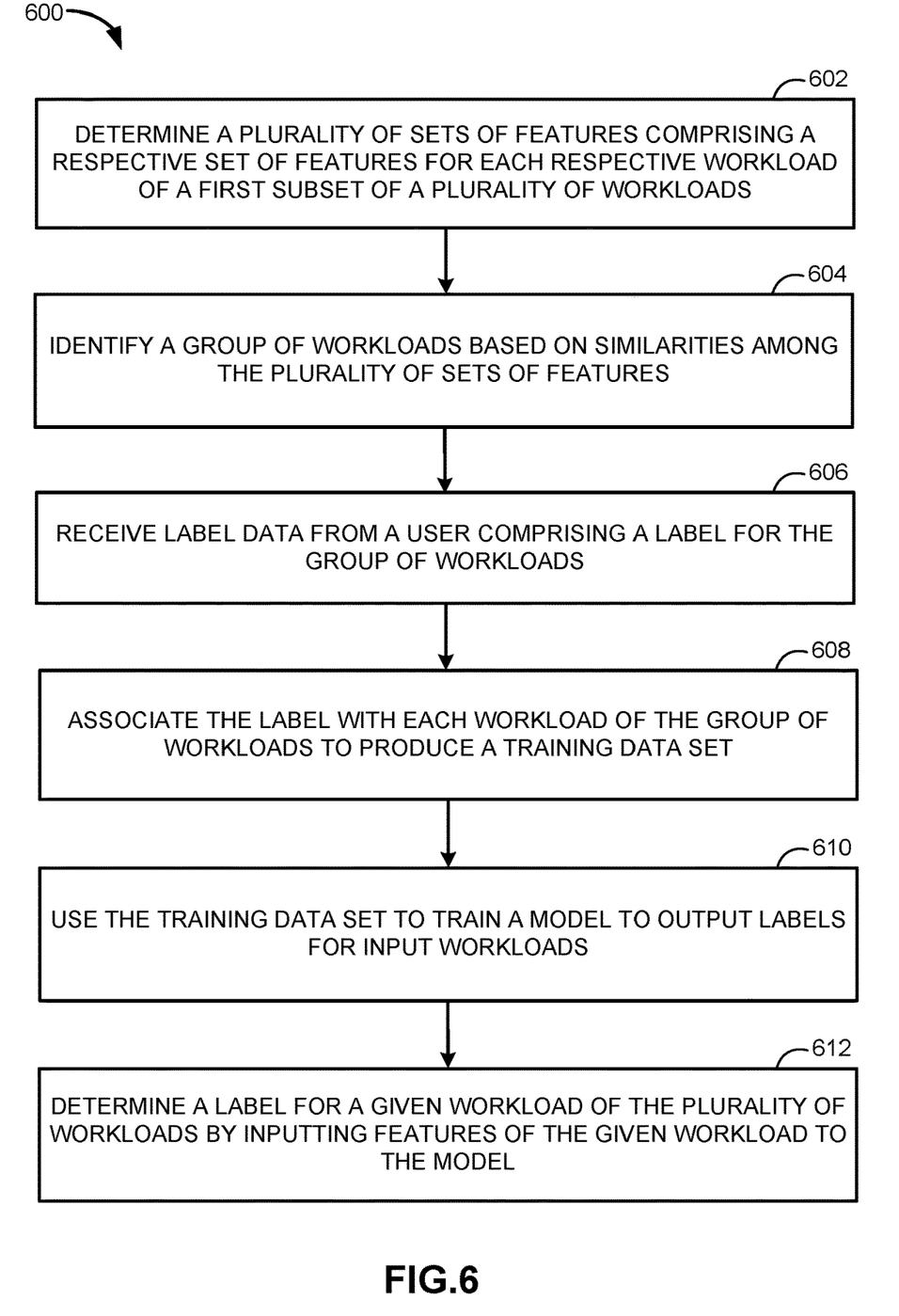
FIG. 6 depicts example operations for workload labeling according to embodiments of the present disclosure.

FIG. 6 depicts example operations 600 for workload labeling according to embodiments of the present disclosure. For example, operations 600 may be performed by monitoring appliance 140 of FIG. 1.

Operations 600 begin with step 602, where a plurality of sets of features comprising a respective set of features for each respective workload of a first subset of a plurality of workloads is determined. For example, monitoring appliance 140 of FIG. 1 may determine the sets of features through interaction with agent 118 of hypervisor 116 on each of hosts 105 of FIG. 1.

Operations 600 continue with step 604, where a group of workloads is identified based on similarities among the plurality of sets of features. For example, monitoring appliance 140 of FIG. 1 may compare features (e.g., using cosine similarity) of the workloads to group similar workloads.

Operations 600 continue with step 606, where label data is received from a user comprising a label for the group of workloads. In some embodiments, the user provides the label via a user interface that displays the grouped workloads along with features of the grouped workloads.

Operations 600 continue with step 608, where the label is associated with each workload of the group of workloads to produce a training data set. In some embodiments, the training data set comprises a plurality of training data instances, each training data instance including features of a given workload and a label associated with the given workload.

Operations 600 continue with step 610, where the training data set is used to train a model to output labels for input workloads. For instance, monitoring appliance 140 of FIG. 1 may train the model as described above with respect to example 500 of FIG. 5.

Operations 600 continue with step 612, where a label is determined for a given workload of the plurality of workloads by inputting features of the given workload to the model. For example, monitoring appliance 140 of FIG. 1 may input the features of the given workload to the model and receive a label as an output as described above with respect to example 500 of FIG.

In some embodiments, the respective set of features for each respective workload of the first subset of the plurality of workloads comprises one or more of: the respective workload does or does not listen on a given port; the respective workload does or does not connect to a given port; the respective workload does or does not run a given local process; the respective workload does or does not connect to a given remote process; a number of connections between the respective workload and a particular port; or a number of local or remote processes for the respective workload. In some embodiments, certain features of a given workload may be derived from other features of the given workload, as described above.

In some embodiments, identifying the group of workloads based on similarities among the plurality of sets of features comprises calculating cosine similarity among the plurality of sets of features.

In certain embodiments, the label data from the user is received via a user interface in response to displaying a subset of features of workloads in the group of workloads in the user interface.

In some embodiments, input is received from the user indicating that a certain workload should be removed from the group of workloads.

In certain embodiments, the model comprises a tree-based model or a linear regression model. In some embodiments, the model may comprise a type of classification model.

In some embodiments, operations 600 further include performing an action with respect to the given workload based on the label for the given workload, wherein the action comprises one or more of: adding the given workload to a security group; applying a security policy to the given workload; performing network segregation involving the given workload; or performing intrusion detection or prevention for the given workload.

Figure 7:
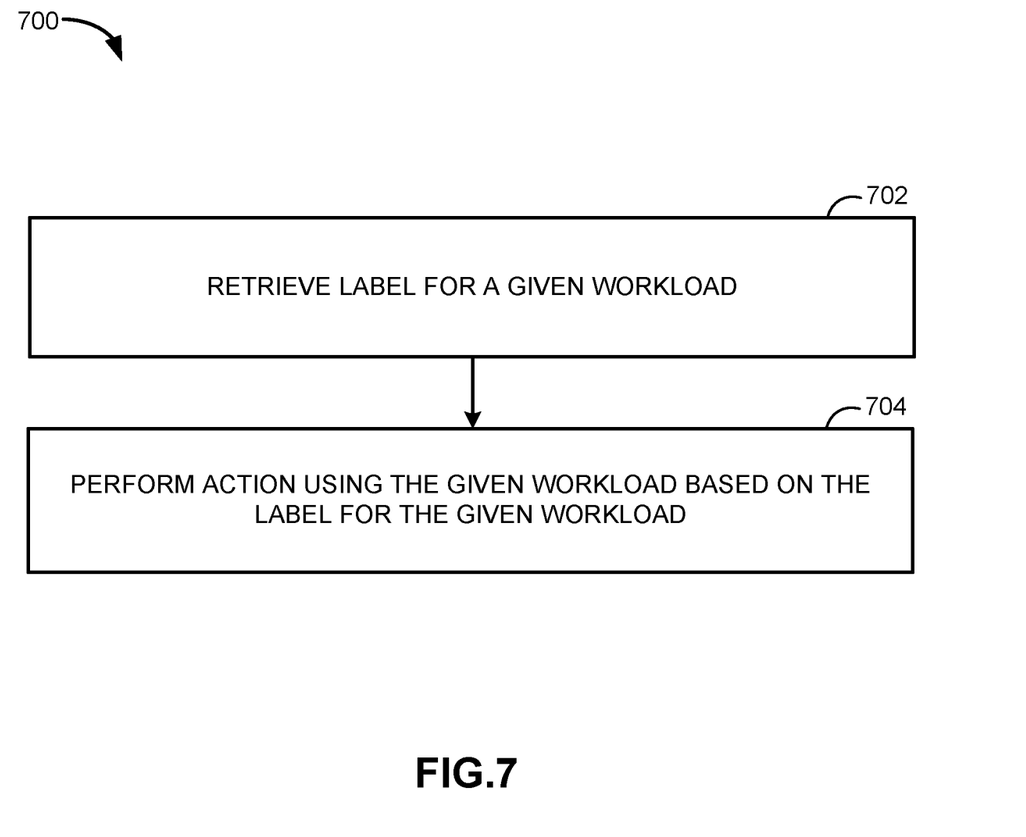
FIG. 7 depicts example operations for using workload labels according to embodiments of the present disclosure.

FIG. 7 depicts additional example operations 700 related to workload labeling according to embodiments of the present disclosure. For example, operations 700 may be performed by monitoring appliance 140 of FIG. 1, manager 138 of FIG. 1, and/or another component, such as a security component.

Operations 700 begin with step 702, where a label for a given workload is retrieved. For example, a label determined using a model according to techniques described herein may be associated with the given workload, and may be retrieved.

Operations 700 continue with step 704, where an action is performed using the given workload based on the label for the given workload. The action may be, for instance, applying a security policy to the given workload based on the label, performing statistical analysis of the given workload using the label (e.g., generating statistics related to performance of all workloads with the label), performing microsegmentation of workloads, including the given workload, based on the label, and the like.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of managing workloads, comprising:
   from a plurality of workloads each comprising a virtual computing instance (VCI) running a plurality of processes, identifying a group of workloads that have similar respective values associated with a set of respective features;
   displaying information about one of the workloads via a user interface, wherein the information comprises one or more of the values associated with the set of respective features;
   receiving a label via the user interface in response to the displaying of the information about the one of the workloads;
   associating the label with each workload of the group of workloads;
   producing a training data set comprising the values associated with the features of each workload in the group of workloads and the associated label;
   training a machine learning model using the training data set;

generating, using the machine learning model, a predicted label for a new workload of the plurality of workloads by inputting values associated with the features of the new workload to the machine learning model, wherein the new workload is not a member of the group of workloads; and assigning the predicted label to the new workload and applying security policies to the new workload based on the assigned label.

2. The method of claim 1, wherein the set of features comprises one or more of:
   a number of connections between the respective workload and a particular port;
   a number of local or remote processes for the respective workload;
   the respective workload does or does not listen on a given port;
   the respective workload does or does not connect to a given port;
   the respective workload does or does not run a given local process; or
   the respective workload does or does not connect to a given remote process.

3. The method of claim 1, wherein identifying the group of workloads based on similarities among the plurality of sets of features comprises calculating cosine similarity among the plurality of sets of features.

4. The method of claim 1, further comprising receiving input via the user interface indicating that a certain workload should be removed from the group of workloads.

5. The method of claim 1, wherein the machine learning model comprises a classification model, a tree-based model, or a linear regression model.

6. The method of claim 1, further comprising performing an action with respect to the new workload based on the predicted label for the new workload, wherein the action comprises one or more of:
   adding the new workload to a security group;
   applying a security policy to the given workload;
   performing network segregation involving the new workload;
   performing intrusion detection or prevention for the new workload; or
   generating a visualization including the new workload.

7. The method of claim 1, further comprising re-training the machine learning model based on the predicted label for the new workload.

8. A system, comprising:
   a processor; and
   a memory comprising instructions that, when executed by the processor, cause the system to perform a method for workload management, the method comprising:
      from a plurality of workloads each comprising a virtual computing instance (VCI) running a plurality of processes, identifying a group of workloads that have similar respective values associated with a set of respective features;
      displaying information about one of the workloads via a user interface, wherein the information comprises one or more of the values associated with the set of respective features;
      receiving a label via the user interface in response to the displaying of the information about the one of the workloads;
      associating the label with each workload of the group of workloads;
      producing a training data set comprising the values associated with the features of each workload in the group of workloads and the associated label;
      training a machine learning model using the training data set;
      generating, using the machine learning model, a predicted label for a new workload of the plurality of workloads by inputting values associated with the features of the new workload to the machine learning model, wherein the new workload is not a member of the group of workloads; and
      assigning the predicted label to the new workload and applying security policies to the new workload based on the assigned label.

9. The system of claim 8, wherein the set of features comprises one or more of:
   a number of connections between the respective workload and a particular port;
   a number of local or remote processes for the respective workload;
   the respective workload does or does not listen on a given port;
   the respective workload does or does not connect to a given port;
   the respective workload does or does not run a given local process; or
   the respective workload does or does not connect to a given remote process.

10. The system of claim 8, wherein identifying the group of workloads based on similarities among the plurality of sets of features comprises calculating cosine similarity among the plurality of sets of features.

11. The system of claim 8, wherein the method further comprises receiving input via the user interface indicating that a certain workload should be removed from the group of workloads.

12. The system of claim 8, wherein the machine learning model comprises a classification model, a tree-based model, or a linear regression model.

13. The system of claim 8, wherein the method further comprises performing an action with respect to the new workload based on the predicted label for the new workload, wherein the action comprises one or more of:
   adding the new workload to a security group;
   performing network segregation involving the new workload;
   performing intrusion detection or prevention for the new workload; or
   generating a visualization including the new workload.

14. The system of claim 8, wherein the method further comprises re-training the machine learning model based on the predicted label for the new workload.

15. A non-transitory computer-readable medium comprising instructions that, when executed by a processor of a computing system, cause the computing system to perform a method for workload management, the method comprising:
   from a plurality of workloads each comprising a virtual computing instance (VCI) running a plurality of processes, identifying a group of workloads that have similar respective values associated with a set of respective features;
   displaying information about one of the workloads via a user interface, wherein the information comprises one or more of the values associated with the set of respective features;

receiving a label via the user interface in response to the displaying of the information about the one of the workloads;

associating the label with each workload of the group of workloads;

producing a training data set comprising the values associated with the features of each workload in the group of workloads and the associated label;

training a machine learning model using the training data set;

generating, using the machine learning model, a predicted label for a new workload of the plurality of workloads by inputting values associated with the features of the new workload to the machine learning model, wherein the new workload is not a member of the group of workloads; and assigning the predicted label to the new workload and applying security policies to the new workload based on the assigned label.

16. The non-transitory computer-readable medium of claim 15, wherein the set of features comprises one or more of:
- a number of connections between the respective workload and a particular port;
- a number of local or remote processes for the respective workload;
- the respective workload does or does not listen on a given port;
- the respective workload does or does not connect to a given port;
- the respective workload does or does not run a given local process; or
- the respective workload does or does not connect to a given remote process.

17. The non-transitory computer-readable medium of claim 15, wherein identifying the group of workloads based on similarities among the plurality of sets of features comprises calculating cosine similarity among the plurality of sets of features.

* * * * *